(12) United States Patent
Kim

(10) Patent No.: US 9,374,730 B2
(45) Date of Patent: Jun. 21, 2016

(54) METHOD AND APPARATUS FOR HANDOVER IN A MOBILE STATION SUPPORTING RADIO ACCESS TECHNOLOGY

(75) Inventor: Hye-Jeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 13/019,357

(22) Filed: Feb. 2, 2011

(65) Prior Publication Data

US 2011/0188471 A1    Aug. 4, 2011

(30) Foreign Application Priority Data

Feb. 2, 2010    (KR) .................. 10-2010-0009599

(51) Int. Cl.
| | |
|---|---|
| *H04W 36/14* | (2009.01) |
| *H04W 36/22* | (2009.01) |
| *H04W 36/08* | (2009.01) |
| *H04W 36/28* | (2009.01) |
| *H04W 36/30* | (2009.01) |
| *H04W 72/08* | (2009.01) |
| *H04W 24/10* | (2009.01) |
| *H04W 36/00* | (2009.01) |
| *H04W 88/06* | (2009.01) |

(52) U.S. Cl.
CPC .......... *H04W 24/10* (2013.01); *H04W 36/0061* (2013.01); *H04W 36/14* (2013.01); *H04W 88/06* (2013.01)

(58) Field of Classification Search
CPC . H04W 36/14; H04W 36/26; H04W 36/0055; H04W 36/0061; H04W 36/0066; H04W 36/0072; H04W 36/0022; H04W 36/003; H04W 36/0036; H04W 36/30; H04W 36/36; H04W 76/025
USPC ............. 370/310–310.2, 328–338, 208; 455/436–444, 422.1–460, 524–525, 455/500, 507, 517
See application file for complete search history.

(56) References Cited

U.S. PATENT DOCUMENTS 5,542,097 A * 7/1996 Ward et al. .................. 455/437
6,038,449 A * 3/2000 Corriveau et al. ........... 455/439

(Continued)

FOREIGN PATENT DOCUMENTS

| | | |
|---|---|---|
| JP | 2006304317 A | 11/2006 |
| JP | 2007074264 A | 3/2007 |
| KR | 100658206 B1 | 12/2006 |

OTHER PUBLICATIONS

Notice of Patent Grant dated Oct. 29, 2015 in connection with Korean Application 10-2010-0009599; 7 pages.

*Primary Examiner* — Wutchung Chu

(57) ABSTRACT

A method and apparatus supports Inter-Radio Access Technology (IRAT) Packet Switch (PS) handover during a simultaneous voice and data (SVD) mode in a mobile station that supports a Radio Access Technology (RAT). The method includes determining a state in which a data call is connected through a first system and a voice call is connected through a second system. The MS determines whether handover to the second system should be performed for the data call. A measurement report message that indicates a set of active base stations (BSs) of voice call connection in the second system is generated. And the measurement report message is transmitted to a serving BS of the data call connection in the first system.

18 Claims, 3 Drawing Sheets

(56) References Cited

U.S. PATENT DOCUMENTS

| | | | |
|---|---|---|---|
| 6,282,182 B1* | 8/2001 | Pecen et al. ............... 370/336 |
| 6,516,203 B1* | 2/2003 | Enzmann et al. .......... 455/556.1 |
| 6,542,744 B1* | 4/2003 | Lin ..................... H04W 36/12 455/437 |
| 6,650,905 B1* | 11/2003 | Toskala et al. ............... 455/522 |
| 6,792,277 B2* | 9/2004 | Rajaniemi et al. ......... 455/456.1 |
| 6,804,518 B2* | 10/2004 | Core et al. ................. 455/436 |
| 6,845,236 B2* | 1/2005 | Chang ..................... 455/414.1 |
| 6,847,821 B1* | 1/2005 | Lewis et al. ............... 455/452.2 |
| 6,917,810 B2* | 7/2005 | Julka et al. ................ 455/439 |
| 7,298,327 B2* | 11/2007 | Dupray ................. G01S 1/026 342/451 |
| 7,359,347 B2* | 4/2008 | Ahmavaara et al. ......... 370/328 |
| 7,623,865 B2* | 11/2009 | Julka et al. ................ 455/439 |
| 7,738,424 B2* | 6/2010 | Ng et al. ..................... 370/331 |
| 7,961,687 B2* | 6/2011 | Holcman et al. ............. 370/331 |
| 7,979,072 B2* | 7/2011 | Senarath ............... H04W 36/18 455/435.1 |
| 8,078,178 B2* | 12/2011 | Islam et al. ................. 455/445 |
| 8,094,620 B2* | 1/2012 | Diachina et al. ............ 370/331 |
| 8,150,392 B1* | 4/2012 | Mcconnell et al. ......... 455/432.1 |
| 8,223,794 B2* | 7/2012 | Barzegar ............... H04W 36/14 370/331 |
| 8,442,544 B2* | 5/2013 | Abraham ............. H04W 72/02 455/452.2 |
| 8,503,394 B2* | 8/2013 | Lee et al. ..................... 370/331 |
| 8,504,003 B2* | 8/2013 | Chae ................... H04L 63/105 455/415 |
| 8,565,756 B2* | 10/2013 | Vashi ................... H04W 24/10 370/470 |
| 8,599,880 B1* | 12/2013 | Srinivas ............... H04W 36/04 370/216 |
| 8,711,846 B2* | 4/2014 | Mahdi et al. ................ 370/354 |
| 8,929,331 B2* | 1/2015 | Karaoguz ........... H04W 84/045 370/331 |
| 8,942,750 B2* | 1/2015 | Marquez ............. H04W 52/40 455/522 |
| 9,026,099 B2* | 5/2015 | Chhabra ............. H04W 48/16 455/418 |
| 2002/0142771 A1* | 10/2002 | Saifullah et al. .............. 455/436 |
| 2003/0045321 A1* | 3/2003 | Kim et al. ..................... 455/522 |
| 2003/0054822 A1* | 3/2003 | Core et al. ..................... 455/436 |
| 2003/0104813 A1* | 6/2003 | Julka et al. ................... 455/436 |
| 2003/0169725 A1* | 9/2003 | Ahmavaara et al. .......... 370/352 |
| 2004/0008645 A1* | 1/2004 | Janevski et al. .............. 370/331 |
| 2004/0203788 A1* | 10/2004 | Fors et al. ..................... 455/439 |
| 2004/0246990 A1* | 12/2004 | Krishnamurthi et al. ...... 370/466 |
| 2005/0047492 A1* | 3/2005 | Amerga et al. ............... 375/150 |
| 2005/0073990 A1* | 4/2005 | Chang et al. ................. 370/349 |
| 2005/0181805 A1* | 8/2005 | Gallagher .................. 455/456.1 |
| 2005/0266853 A1* | 12/2005 | Gallagher et al. ............ 455/439 |
| 2006/0056393 A1* | 3/2006 | Sarmiento .................... 370/352 |
| 2006/0133309 A1* | 6/2006 | Mathis et al. ................. 370/328 |
| 2006/0246906 A1* | 11/2006 | Vaittinen et al. .............. 455/442 |
| 2006/0268781 A1* | 11/2006 | Svensson et al. .............. 370/331 |
| 2007/0010252 A1* | 1/2007 | Balachandran et al. ...... 455/437 |
| 2007/0021120 A1* | 1/2007 | Flore et al. ..................... 455/436 |
| 2007/0081497 A1* | 4/2007 | Drevon ....................... 370/331 |
| 2007/0165599 A1* | 7/2007 | Skog et al. .................... 370/352 |
| 2007/0249354 A1* | 10/2007 | Seo et al. ..................... 455/436 |
| 2008/0026752 A1* | 1/2008 | Flore et al. ................. 455/435.2 |
| 2008/0026755 A1* | 1/2008 | Venkataraman et al. ...... 455/436 |
| 2008/0267128 A1* | 10/2008 | Bennett et al. ................ 370/331 |
| 2009/0005048 A1* | 1/2009 | Bae et al. ..................... 455/439 |
| 2009/0010247 A1* | 1/2009 | Stille ............................ 370/352 |
| 2009/0154426 A1* | 6/2009 | Perraud et al. ................ 370/332 |
| 2009/0170159 A1* | 7/2009 | Bobrowicz et al. ........... 435/69.1 |
| 2009/0268690 A1* | 10/2009 | Sebire ................... H04W 48/10 370/332 |
| 2010/0040020 A1* | 2/2010 | Chen ........................... 370/331 |
| 2010/0172323 A1* | 7/2010 | Rexhepi ............. H04W 36/0016 370/331 |
| 2010/0202413 A1* | 8/2010 | Vikberg et al. ............... 370/332 |
| 2010/0278142 A1* | 11/2010 | Dwyer et al. ................ 370/331 |
| 2011/0090872 A1* | 4/2011 | Dahl n et al. ................ 370/332 |
| 2011/0188468 A1* | 8/2011 | Vikberg et al. ............... 370/331 |
| 2011/0268083 A1* | 11/2011 | Ostrup et al. ................ 370/331 |
| 2011/0281587 A1* | 11/2011 | Jokinen et al. ................ 455/437 |
| 2013/0010740 A1* | 1/2013 | Kim et al. .................... 370/329 |
| 2013/0258949 A1* | 10/2013 | Bari et al. .................... 370/328 |

* cited by examiner

METHOD AND APPARATUS FOR HANDOVER IN A MOBILE STATION SUPPORTING RADIO ACCESS TECHNOLOGY

CROSS-REFERENCE TO RELATED APPLICATION(S) AND CLAIM OF PRIORITY

This application claims priority under 35 U.S.C. §119(a) to a Korean Patent Application filed in the Korean Intellectual Property Office on Feb. 2, 2010 and assigned Serial No. 10-2010-0009599, the contents of which are herein incorporated by reference.

TECHNICAL FIELD OF THE INVENTION

The present invention relates to a handover of a Mobile Station (MS) supporting a Radio Access Technology (RAT). More particularly, the present invention relates to a packet service handover of Inter RAT (IRAT).

BACKGROUND OF THE INVENTION

Presently, 2nd Generation (2G) systems and 3rd Generation (3G) systems are mainly being used. Currently, the standardization of Long Term Evolution (LTE) systems that are 4th Generation (4G) systems is in progress.

Because current LTE systems basically support packet service only, proposals for a more robust LTE standard include a Circuit Switch (CS) fallback service to provide a voice call to a user. The CS fallback service means a service for, when a voice call is generated for an MS that is camping on the LTE system, allowing the MS to handover to a 2G/3G legacy system and achieving a voice call connection.

Alternatively, a dual transceiver MS capable of simultaneously communicating with a Radio Access Technology (RAT) may receive packet service through the LTE system and simultaneously receive voice service through the 2G/3G legacy system. For example, when the MS is located in an area where the LTE system and a WCDMA system co-exist, the MS may simultaneously camp on the LTE system and the WCDMA system using a dual transceiver, and may monitor paging for the two systems at an idle mode as well as monitor paging of the WCDMA system even in course of receiving packet data service through the LTE system.

If an MS that supports the RAT gets out of a cell area of the LTE system by a user while simultaneously using data and voice services within the cell area of the LTE system, the MS should perform handover to a legacy system for a data call. At this time, for the data call, the MS should attempt handover to a legacy BS of voice call connection to perform successful handover. However, a serving BS that is in data call connection with the MS simply determines a handover target BS for the data call on the basis of a measurement report message received from the MS. Consequently, the serving BS may determine a different legacy BS, not the legacy BS of voice call connection, as a handover target BS. This leads to a failure of handover for the data call.

SUMMARY OF THE INVENTION

An aspect of the present invention is to substantially solve at least the above problems and/or disadvantages and to provide at least the advantages below. Accordingly, one aspect of the present invention is to provide a handover method and apparatus for Inter Radio Access Technology (IRAT) Packet Switch (PS) service in a Mobile Station (MS) that supports Radio Access Technology (RAT).

Another aspect of the present invention is to provide a method and apparatus for performing handover to a Base Station (BS) of voice call connection upon determining that an IRAT PS handover is appropriate during a Simultaneous Voice and Data (SVD) mode in an MS that supports an RAT. For purposes of the present disclosure, "simultaneous" may be used interchangeably with "concurrent."

Another aspect of the present invention is to provide a method and apparatus in which a mobile station that supports RAT transmits a measurement report message that includes neighboring BS preference information to a serving BS.

Yet another aspect of the present invention is to provide a method and apparatus for generating and transmitting a measurement report message that includes information on a BS of voice call connection, upon determining to perform IRAT PS handover during an SVD mode in an MS that supports RAT.

The above aspects are achieved by providing a method and apparatus for handover in a mobile station that supports a Radio Access Technology (RAT).

According to one aspect of the present invention, a method for handover in a mobile station supporting an RAT is provided. The method includes determining a state in which a data call is connected through a first system and a voice call is connected through a second system. Whether handover to the second system should be performed for the data call is determined. A measurement report message that indicates set of active base stations (BSs) of voice call connection in the second system is generated. And the measurement report message is transmitted to a serving BS of the data call connection in the first system.

According to another aspect of the present invention, an apparatus for handover in a mobile station supporting an RAT is provided. The apparatus includes a first transceiver for transmitting and receiving signals of a first system. A second transceiver for transmits and receives signals of a second system. And a controller determines whether handover to the second system should be performed for the data call, generates a measurement report message that indicates a set of active base stations (BSs) of voice call connection, and transmits the measurement report message to a serving BS of the data call connection in the first system.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
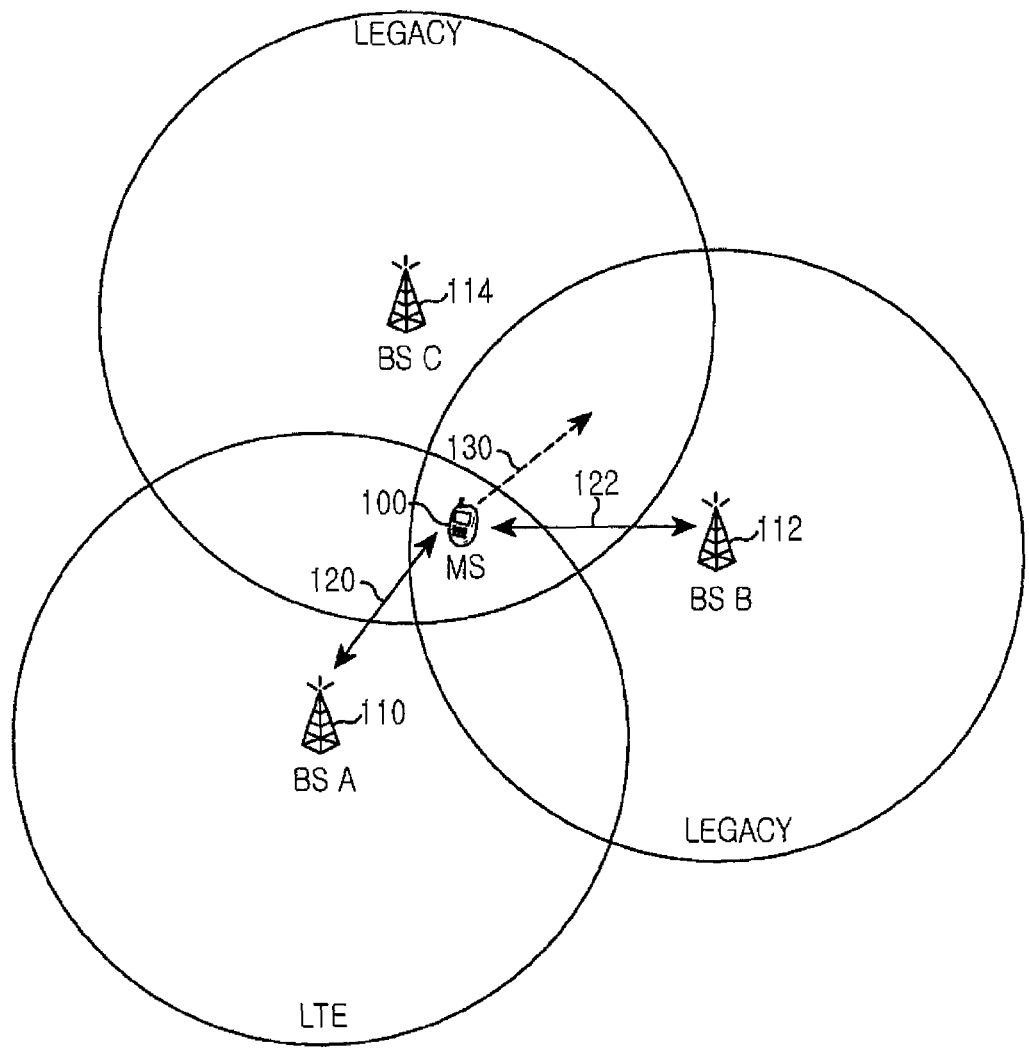
FIG. 1 is a diagram illustrating a construction of a radio access technology according to the principles of the present invention.
Figure 2:
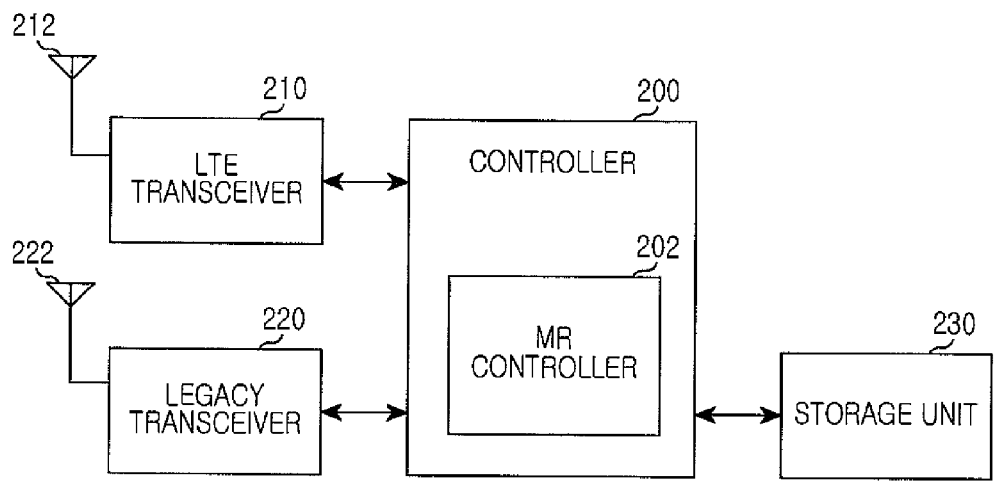
FIG. 2 is a block diagram illustrating a construction of a Mobile Station (MS) according to an embodiment of the present invention.
Figure 3:
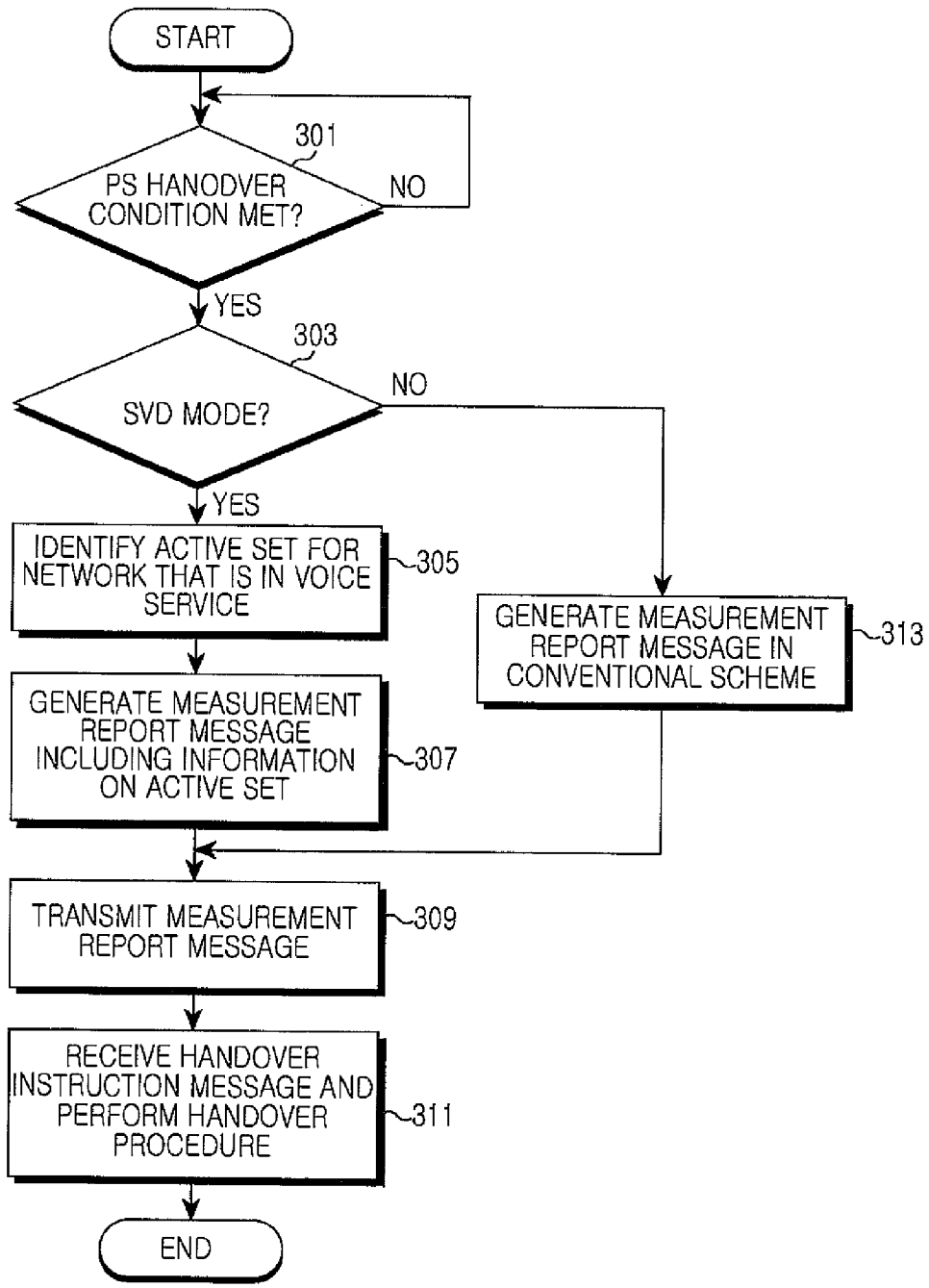
FIG. 3 is a flow diagram illustrating a handover procedure of an MS according to an embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile station.

The following description is made for a method and apparatus for performing handover to a Base Station (BS) of voice call connection, when handover for an Inter Radio Access Technology (IRAT) Packet Switch (PS) service is appropriate during a Simultaneous Voice and Data (SVD) mode in a Mobile Station (MS) that supports a Radio Access Technology (RAT). Below, the MS of the present invention supports a Long Term Evolution (LTE) system and a legacy system, and the legacy system represents an existing 2nd Generation/3rd Generation (2G/3G) system such as Global System for Mobile communication (GSM), High Speed Packet Access/Wideband Code Division Multiple Access (HSPA/WCDMA), and Evolution Data Only/Code Division Multiple Access 1x (EVDO/CDMA1x).

FIG. 1 illustrates a construction of a Radio Access Technology (RAT) according to the present invention.

Referring to FIG. 1, an MS 100 is a multi-mode MS that includes a dual transceiver and supports an RAT. If a voice call is generated during a data call connection 120 through a BS A 110 of an LTE system, the MS 100 gets in voice call connection 122 through a BS B 112 of a legacy system.

After that, if the MS 100 moves in direction 130 out of a cell area of the BS A 110, the MS 100 may determine that an IRAT handover is appropriate. At this time, the MS 100 may determine to perform the IRAT handover based on a signal intensity of the BS A 110 for the data call connection and signal intensities of the BS B 112 for the voice call connection and a neighboring BS C 114.

If it is determined that the IRAT handover should be performed, the MS 100 generates a measurement report message for inducing the BS B 112 of voice call connection to be determined as a handover target BS and transmits the measurement report message to the BS A 110 according to an embodiment of the present invention. At this time, in order to determine the BS B 112 as the handover target BS, the MS 100 may indicate that the MS 100 is in voice call connection with the BS B 112 in the measurement report message or may set a high priority for the BS B 112 included in the measurement report message. Also, the MS 100 may control a signal intensity of the BS B 112 included in the measurement report message to be higher than the original signal intensity. A scheme in which the MS 100 induces the BS B 112 of voice call connection to be determined as the handover target BS is described in detail with reference to FIGS. 2 and 3 below.

After determining the BS B 112 as the handover target BS on the basis of the measurement report message received from the MS 100, the BS A 110 sends the MS 100 a message instructing handover to the BS B 112.

After that, the MS 100 performs a procedure for data call handover to the BSB 112.

In FIG. 1, for convenience, MS 100 is described as having a voice call connection with one BS. However, the MS 100 may connect with a plurality of BSs for a voice call. In the present disclosure, the plurality of BSs connecting with the MS for the voice call are collectively referred to as an active set.

FIG. 2 illustrates a construction of a Mobile Station (MS) according to an embodiment of the present invention.

Referring to FIG. 2, the MS includes a controller 200, an LTE transceiver 210, a first antenna 212, a legacy transceiver 220, a second antenna 222, and a storage unit 230. The controller 200 includes a Measurement Report (MR) controller 202.

The controller 200 performs a control and process for general operation (e.g., voice call, data call, and application operation) of the MS and determines whether to perform IRAT handover for packet service during an SVD mode. Here, the SVD mode represents when the MS receives packet service through an LTE system while simultaneously (or concurrently) receiving voice service through a legacy system. At this time, the LTE transceiver 210 which supports the LTE system and the legacy transceiver 220 which supports the legacy system each operate independently and thus, whether the MS is operating in the SVD mode is determined in the controller 200. The controller 200 may inform the LTE transceiver 210 that the MS is currently operating in the SVD mode. At this time, the controller 200 acquires information of BSs of voice call connection (i.e., active set information) through the legacy transceiver 220 and stores the acquired information in the storage unit 230. Also, the controller 200 may determine whether IRAT handover for packet service should be performed for the MS as the MS leaves a cell area of the LTE system by using intensities of signals provided from the LTE transceiver 210 and the legacy transceiver 220. For example, if an intensity of a signal provided from the LTE transceiver 210 is below a threshold value and an intensity of a signal provided from the legacy transceiver 220 is above the threshold value, the controller 200 determines that the IRAT handover for the packet service should be performed for the MS.

When the determination to perform IRAT handover for the packet service occurs during the SVD mode, the MR controller 202 reads active set information from the storage unit 230 and generates a measurement report message for inducing handover to a BS of voice call connection. At this time, the measurement report message may be generated using one or more of the three schemes described below.

In the first scheme, a new field is added to a measurement report message to indicate whether neighboring BSs are BSs that correspond to an active set or to indicate the priorities of neighboring BSs. For example, assuming that neighboring BSs that meet a preset threshold value are 'A' to 'E', and 'A' and 'C' are the BSs corresponding to the active set, the measurement report message may indicate that 'A' and 'C' are active BSs and that 'B', 'D', and 'E' are inactive BSs in a Boolean scheme, and may set high priorities for 'A' and 'C' as compared to 'B', 'D', and 'E'. At this time, the priorities of 'A' and 'C' may be set to '1' and '2' (indicating the highest priority), and the priorities of 'B', 'D', and 'E' may be set to the same or similar maximum values that indicate lower priority. Here, the priorities of the BSs corresponding to the active set may be determined using a Reference Signal Receive Power (RSRP), a Receive Signal Strength Indicator (RSSI), a pilot strength, recently camped BS information, information on a BS with the highest number of times of camping, long-time camped BS information, and so forth. When the new field is to be added, a corresponding BS is determined to be a handover target BS of an MS in consideration of the new field information.

In the second scheme, only information of the BSs that corresponds to the active set is included in a measurement report message while information of other BSs is excluded. That is, although an intensity of a signal received by the MS meets a threshold value, neighboring BSs that do not correspond to the active set are excluded from the measurement report message, while information of neighboring BSs that correspond to the active set are included in the measurement report message. For example, assuming that neighboring BSs meeting a preset threshold value are 'A' to 'E', and 'A' and 'C' are the BSs corresponding to the active set, 'A' and 'C' may be included in the measurement report message while 'B', 'D', and 'E' may be excluded.

In the third scheme, during measurement report message generation, signal intensities of the BSs corresponding to the active set are set to higher signal intensities. For example, assuming that neighboring BSs meeting a preset threshold value are 'A' to 'E', and 'A' and 'C' are the BSs that correspond to the active set, if signal intensities of respective BSs are A:15, B:22, C:17, D:21, and E:14, the signal intensities of the respective BSs included in the measurement report message may be set as A:15+α, B:22, C:17+β, D:21, and E:14. At this time, the 'α' and 'β' are values making the signal intensities of the 'A' and 'C' larger than signal intensities of inactive BSs. Also, the 'α' and 'β' may be the same value, and may be different values reflecting the priorities of 'A' and 'C'.

After generating the measurement report message in the same scheme, the MR controller 202 provides the measurement report message to the LTE transceiver 210.

When a handover instruction message is received from a BS of the LTE system through the LTE transceiver 210, the controller 200 performs a control and process for performing handover to a handover target BS included in the handover instruction message. Also, when a determination to perform an IRAT handover for packet service occurs but not for a voice call connection, the controller 200 performs a control and process for performing handover according to the conventional scheme.

The LTE transceiver 210 processes signals exchanged with BSs of an LTE system through the first antenna 212. The LTE transceiver 210 communicates packet data with the BS of the LTE system according to the control of the controller 200, measures a signal intensity received from the BS of the LTE system, provides the measured signal intensity to the controller 200, and sends the BS of the LTE system a measurement report message provided from the controller 200.

The legacy transceiver 220 processes signals exchanged with BSs of the legacy system through the second antenna 222. According to the control of the controller 200, the legacy transceiver 220 connects with a plurality of BSs for a voice call and processes signals transmitted and received at the legacy transceiver. The legacy transceiver 220 provides information on the plurality of BSs for the voice call, i.e., active set information to the controller 200.

The storage unit 230 stores various kinds of programs and data for operation of the MS, and stores the active set information according to the present invention.

FIG. 3 illustrates a handover procedure of an MS according to an embodiment of the present invention.

Referring to FIG. 3, in step 301, the MS determines whether the IRAT handover condition for packet service is met during the use of packet service through an LTE system. For example, the MS may determine that the IRAT handover condition for the packet service is satisfied when an intensity of a signal received from a BS of the LTE system is below a threshold value and an intensity of a signal received from a BS of a legacy system is above the threshold value.

In step 303, the MS determines whether it is in an SVD mode. Here, the SVD mode refers a mode in which the MS receives packet service through the LTE system while simultaneously (or concurrently) receiving voice service through the legacy system. At this time, an LTE transceiver 210 supporting the LTE system and a legacy transceiver 220 supporting the legacy system each operate independently and thus, whether the MS is in operation in the SVD mode may be determined in the controller 200. In an embodiment, the sequence of step 301 and step 303 may be changed.

If the MS is not in operation in the SVD mode, i.e., when the MS is in course of receiving the packet service without receiving the voice service, in step 313, the MS generates a measurement report message according to the conventional scheme and proceeds to step 309 below.

In contrast, when the MS is operating in the SVD mode, the MS proceeds to step 305 and identifies a plurality of BSs connected for voice service provision (i.e., BSs corresponding to an active set) in the legacy system. In step 307, the MS generates a measurement report message including information on the active set to induce handover to a BS of voice call connection. At this time, the measurement report message may be generated using any one of the aforementioned three schemes.

In step 309, the MS sends the generated measurement report message to a BS of the LTE system that is currently connected to the MS in a data call connection for the packet service. In step 311, the MS receives a handover instruction message from the BS of the LTE system and performs a handover to a handover target BS.

Upon completion of the handover, the MS terminates the procedure according to an embodiment of the present invention.

The present invention has an effect of, upon determining that handover for IRAT packet switch service is appropriate during an SVD mode in a mobile station supporting a radio access technology, transmitting information on a BS of voice call connection to a BS of data call connection, thereby being capable of inducing handover to the BS of the voice call connection and improving a handover success probability for the packet switch service.

While the invention has been shown and described with reference to certain preferred embodiments thereof, it will be understood by those skilled in the art that various changes in form and details may be made therein without departing from the spirit and scope of the invention as defined by the appended claims.

What is claimed is:
1. A method for handover in a mobile station (MS), the method comprising:
receiving concurrently a data call and a voice call, wherein the data call is connected through a first serving base station (BS) in a first system and the voice call is connected through a second serving BS in a second system;
determining to perform a handover for the data call of the first serving BS;

generating a report message that includes measurement information of a plurality of base stations (BSs) active for a voice call connection in the second system;

transmitting the report message to the first serving BS;

receiving a handover instruction message, including information on a target BS among the plurality of BSs active for the voice call connection in the second system as a function of the measurement information from the first serving BS; and performing the handover from the first BS to the target BS, wherein the target BS is capable of supporting both the data call and the voice call in the second system, wherein the report message includes a signal intensity for each of the plurality of BSs in the second system, and wherein the signal intensity for active BSs among the plurality of BSs is set higher than the signal intensities of other BSs that do not correspond to the active BSs.

2. The method of claim 1, wherein the report message includes a priority value for each of the plurality of BSs in the second system, wherein the priority value is set based on a measured signal intensity for the each of the plurality of BSs greater than a preset threshold value.

3. The method of claim 2, wherein priority values for active BSs among the plurality of BSs are set higher than the priority values of other BSs that do not correspond to the active BSs.

4. The method of claim 2, wherein the priority value for the each of the plurality of BSs is set based on at least one of a Reference Signal Receive Power (RSRP), a Receive Signal Strength Indicator (RSSI), a pilot strength, recently camped BS information, information on a BS with the highest number of times of camping, and long-time camped BS information.

5. The method of claim 1, wherein the signal intensity for the each of the plurality of BSs is set based on a measured signal intensity for each of the plurality of BSs greater than a preset threshold value.

6. The method of claim 1 wherein the signal intensity for the each of the plurality of BSs is set based on at least one of a Reference Signal Receive Power (RSRP), a Receive Signal Strength Indicator (RSSI), a pilot strength, recently camped BS information, information on a BS with the highest number of times of camping, and long-time camped BS information.

7. The method of claim 1, wherein the handover to the second system is performed when an intensity of a signal received from the first serving BS is below a preset threshold value and an intensity of a signal received from a one of the plurality of BSs is above the threshold value.

8. The method of claim 1, wherein the first system supports only data service and the second system supports data service and voice service.

9. The method of claim 1, wherein the least one of the plurality of BSs active for a voice call connection in the second system supports both a voice call and a data call, and the corresponding BS comprises the second serving BS.

10. An apparatus for handover in a mobile station, the apparatus comprising:

a first transceiver configured to transmit and receive signals of a first system;

a second transceiver configured to transmit and receive signals of a second system; and a controller configured to determine to perform a handover for a data call of the first serving BS while concurrently receiving the data call and a voice call, wherein the data call is connected through a first serving base station (BS) in the first system and a voice call is connected through a second serving BS in the second system, generate a report message that includes measurement information of a plurality of base stations BSs) active for a voice call connection in the second system, transmit the report message to the first serving BS, receive a handover instruction message including information on a target BS among the plurality of BSs active for the voice call connection in the second system as a function of the measurement information from the first serving BS, and perform the handover from the first BS to the target BS, wherein the target BS is capable of supporting both the data call and the voice call in the second system based on the measurement information, wherein the report message includes a signal intensity for each of the plurality of BSs in the second system, and wherein the signal intensity for active BSs among the plurality of BSs is set higher than the signal intensities of other BSs that do not correspond to the active BSs.

11. The apparatus of claim 10, wherein the report message includes a priority value for each of the plurality of BSs in the second system, wherein the priority value is set based on a measured signal intensity for the each of the plurality of BSs greater than a preset threshold value.

12. The apparatus of claim 11, wherein priority values for active BSs among the plurality of BSs are set higher than the priority values of other BSs that do not correspond to the active BSs.

13. The apparatus of claim 11, wherein the priority value for the each of the plurality of BSs is set based on at least one of a Reference Signal Receive Power (RSRP), a Receive Signal Strength Indicator (RSSI), a pilot strength, recently camped BS information, information on a BS with the highest number of times of camping, and long-time camped BS information.

14. The apparatus of claim 10, wherein the signal intensity for the each of the plurality of BSs is set based on a measured signal intensity for each of the plurality of BSs greater than a preset threshold value.

15. The apparatus of claim 10, wherein the signal intensity for the each of the plurality of BSs is set based on at least one of a Reference Signal Receive Power (RSRP), a Receive Signal Strength Indicator (RSSI), a pilot strength, recently camped BS information, information on a BS with the highest number of times of camping, and long-time camped BS information.

16. The apparatus of claim 10, wherein the handover to the second system is performed when an intensity of a signal received from the first serving BS is below a preset threshold value and an intensity of a signal received from a one of the plurality of BSs is above the threshold value.

17. The apparatus of claim 10, wherein the first system supports only data service and the second system supports data service and voice service.

18. The apparatus of claim 10, wherein the least one of the plurality of BSs active for a voice call connection in the second system supports both a voice call and a data call, and the corresponding BS comprises the second serving BS.

* * * * *